United States Patent

[11] 3,598,904

[72] Inventor Gerhard Foerster
Vienna, Austria
[21] Appl. No. 745,544
[22] Filed July 17, 1968
[45] Patented Aug. 10, 1971
[73] Assignee U.S. Philips Corporation
New York, N.Y.
[32] Priority July 20, 1967
[33] Austria
[31] 6749/67

[54] METHOD AND DEVICE FOR CHANGING A SIMULTANEOUS TELEVISION SIGNAL TO A LINE SEQUENTIAL SIGNAL AND VICE VERSA
20 Claims, No Drawings

[52] U.S. Cl. .......... 178/5.2 R, 178/5.4 C
[51] Int. Cl. .......... H04n 9/42
[50] Field of Search .......... 178/5.4 S, 5.4 C, 69.5 TV, 5.4 H, 5.4 CD, 5.4 SY, 5.4 ST, 5.2 R; 179/15 BS

[56] References Cited
UNITED STATES PATENTS
3,436,469 4/1969 Nakazawa .......... 178/5.4

*Primary Examiner*—Robert L. Griffin
*Assistant Examiner*—John C. Martin
*Attorney*—Frank R. Trifari

ABSTRACT: In a system for converting simultaneous television signals to line sequential signals, and for reconverting the line sequential signals back to simultaneous signals, the conversion and reconversion are accomplished by means of synchronous switches. In order to synchronize the switches, less than the total number of signals are produced with line-synchronizing pulses, and the synchronous switches are controlled by ring counters stepped by line-synchronizing pulses. The counters are reset to fixed positions in response to field-synchronizing pulses.

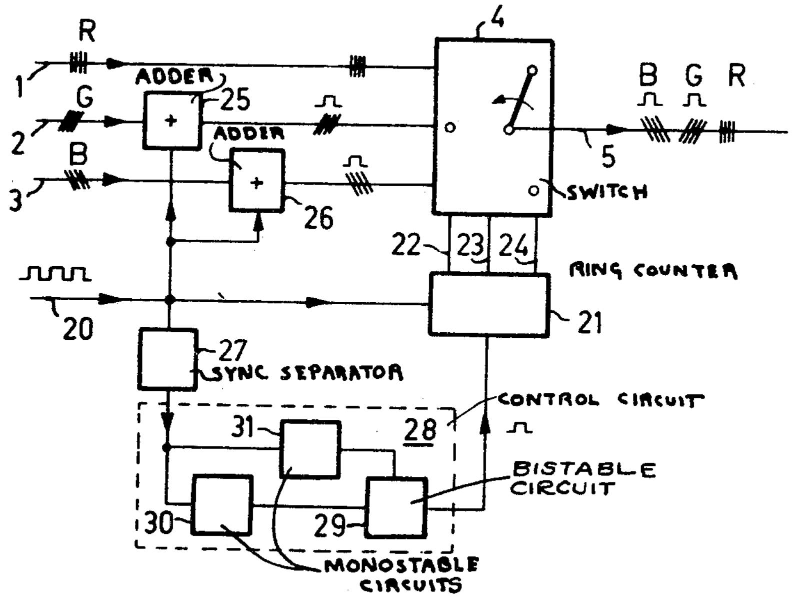

INVENTOR.
GERHARD FOERSTER

BY

AGENT

INVENTOR

GERHARD FOERSTER

BY [signature]

AGENT

INVENTOR

GERHARD FOERSTER

BY

AGENT

METHOD AND DEVICE FOR CHANGING A SIMULTANEOUS TELEVISION SIGNAL TO A LINE SEQUENTIAL SIGNAL AND VICE VERSA

This invention relates to a method and a device for changing a simultaneous television signal to a line sequential signal and vice versa, in which for obtaining the sequential signal the television signal of each line is split up into $n$ partial components which are alternately transmitted in time sequence from line to line by means of a switch controlled by the synchronizing pulses of the television signal, the television signal being recovered by applying the sequential signal to $n$ channels, retarding the partial components in time in $(n-1)$ channels and composing them into a simultaneous television signal for each line by means of $n$ synchronously controlled switches. As is well known, such a method permits of reducing the bandwidth necessary for the transmission of a signal, if a certain decrease in definition of the image is taken into the bargain. Such a method may advantageously be used, for example, in recording or reproducing color television signals. However, it is essential that the switches for splitting up and recomposing the television signal shall switch in the correct sequence. For this purpose it has previously been suggested to add identification pulses to the television signal which serve, together with the synchronizing pulses of the television signal, to control the switches via counting devices.

An object of the invention is to provide a very simple and securely operating method of the kind mentioned in the preamble. To this end, the method according to the invention is characterized in that upon forming the sequential signal, only snychronizing pulses of the television signal are transmitted with at least one of the $(n-1)$ partial components and that, upon recovering the television signal, the switches are controlled by these synchronizing pulses of the television signal which are transmitted with the sequential signal, and that by fixing the position of the switch for forming the sequential signal, upon occurrence of the picture-synchronizing pulse, a determined partial component intended for the transmission of synchronizing pulses is automatically transmitted, the position of the switch being fixed through a control device actuated by the picture-synchronizing pulse, and that upon recovering the simultaneous signal, the positions of the corresponding switches are fixed by a blocking device upon occurrence of the picture-synchronizing pulse in the partial component transmitted. It is thus ensured that the synchronizing pulses of the television signal, since they are not transmitted with all of the partial components, are themselves a criterion for the position which the switches must occupy in each case, whilst in order to obtain a faultless transmission of the picture-synchronizing pulse and to ensure that, after the transmission of the picture-synchronizing pulse, the switching sequence of the lines always begin with the transmission of the same partial component, the switches are fixed on given positions during the transmission of the picture pulse. Upon recovering the simultaneous television signal, the synchronizing pulses present in the $n$-channels are advantageously composed to form the complete synchronizing signal, by which the switches are continuously switched further, and an additional automatic control signal for the switches is derived from the synchronizing pulses taken from at least one channel. A method which excels especially by its simplicity is characterized in that upon forming the sequential signal, synchronizing pulses of the television signal are in each case transmitted only with one partial component, and that upon recovering the television signal, the synchronizing pulses are derived from all of the $n$-channels for switching the switches, continuously further, the additional automatic control signal for the switches being obtained by deriving he synchronizing pulses from a single channel. The said steps are very suitable for a method in which a color television signal is split up into two partial components, one partial component comprising the brightness signal (Y) and the other partial component comprising the color information (R-Y, B-Y), synchronizing pulses of the television signal being transmitted with the partial component which comprises the brightness signal.

However, since the synchronizing pulses of the television signal which control the switches must themselves also be transmitted, it has been found very advantageous if for forming the sequential signal, at least the partial components which contain the synchronizing pulses are applied to the switch through a retardation element and, upon recovering the television signal, the partial components in the $n$-channels are applied to the switches through identical retardation elements, the retardation time of the individual elements being chosen of the order of magnitude of one-hundredth of the line period. The synchronizing pulses thus reach with security the switch which already occupies the correct position, so that these pulses cannot be distorted.

In line sequential systems the case may arise that the number of partial components is no integer in the number of lines. In such cases compensating pulses have hitherto been introduced by which the switches are brought again to the correct starting position upon each frame. In the method according to the invention these difficulties are eliminated in a simple manner by fixing the positions of the switches during the picture pulse. After these positions have been fixed by the picture-synchronizing pulse, the release for switching from line to line from one partial component to another advantageously takes place a fixed time interval of the order of 20 line periods after the picture-synchronizing pulse. In fact, it is thus ensured that the sequential splitting up in each frame invariably begins at the same line and with the same partial component.

In order that the invention may be readily carried into effect, a few embodiments will now be described in detail, by way of example, with reference to the accompanying diagrammatic drawings, in which.

Figure 1:
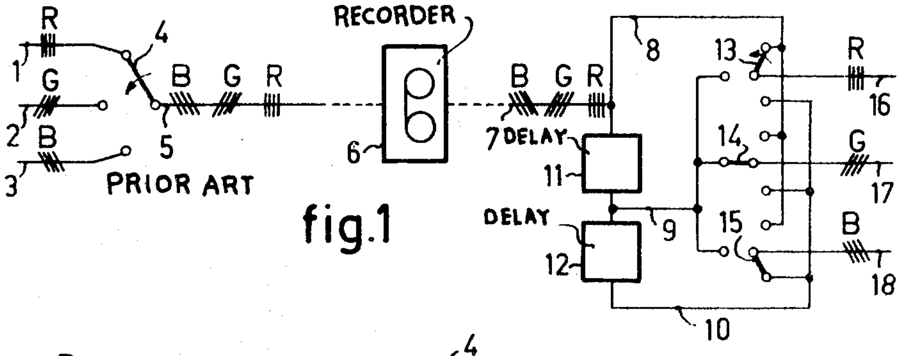
FIG. 1 shows the principle of a known three-line sequential system for converting a color television signal.

The diaphragm of FIG. 1 shows three channels 1, 2 and 3, through which the color television signal is transmitted in three individual partial components, red R, green G and blue B. Thus, in the present example, $n$=3. A switch, indicated by 4, is switched from line to line alternately to one of the channels 1 to 3, so that there is transmitted through line 5 in succession the red color signal by one line, the green color signal by the next line, the blue color signal by the subsequent line, the red color signal again by the line which then follows, etc. Thus the three partial components of the color television signal are transmitted successively in line sequence. As is well known, due to its bandwidth being smaller than that of the simultaneous television signal, such a signal is very suitable to be recorded on a recording and playback apparatus 6. On playing back from the apparatus 6 it is necessary to recover a simultaneous television signal from the sequential signal reproduced. As is well known, this is effected in such manner that the sequential signal is again applied through a line 7 to three channels 8, 9 and 10. In the channel 8 the signal is transmitted directly. In the channel 9, however, the sequential signal is delayed by one line by means of a retardation device 11, and in the channel 10 the signal is delayed by two lines relative to the undelayed signal in the channel 8 by means of a retardation device 12 in conjunction with the retardation device 11. Thus three partial components, that is to say the red, green and blue color information, are available at any time. The three partial components are composed by means of three switches 13, 14 and 15, which are synchronously controlled in such manner that each switch transmits one of the partial components as a function of the channel in which it occurs. Thus, a red, green and blue color information is simultaneously available in each line on channels 16, 17 and 18.

As a matter of fact, such sequential signals are suitable not only for recording and reproducing purposes but, for example, also for transmission through narrow-band lines, beam radio communication and the like. Furthermore these methods are not limited to color television signals, it being possible to transmit in a similar manner a black-and-white television signal by splitting up the frequency band thereof into partial regions, in which event the higher frequency ranges, for example, are transposed on the lowest range and these signals are then transmitted sequentially.

As will readily be appreciated, the switches must of course be controlled in a given sequence and absolutely in synchronism with one another. As is well known, this is ensured by the synchronizing pulses of the television signal together with additional identification pulses which determine the start and the sequence of the sequential splitting up. The methods according to the invention which will be described hereinafter provide very advantageous solutions for the problem of the control of the switches.

Figures 2, 3:
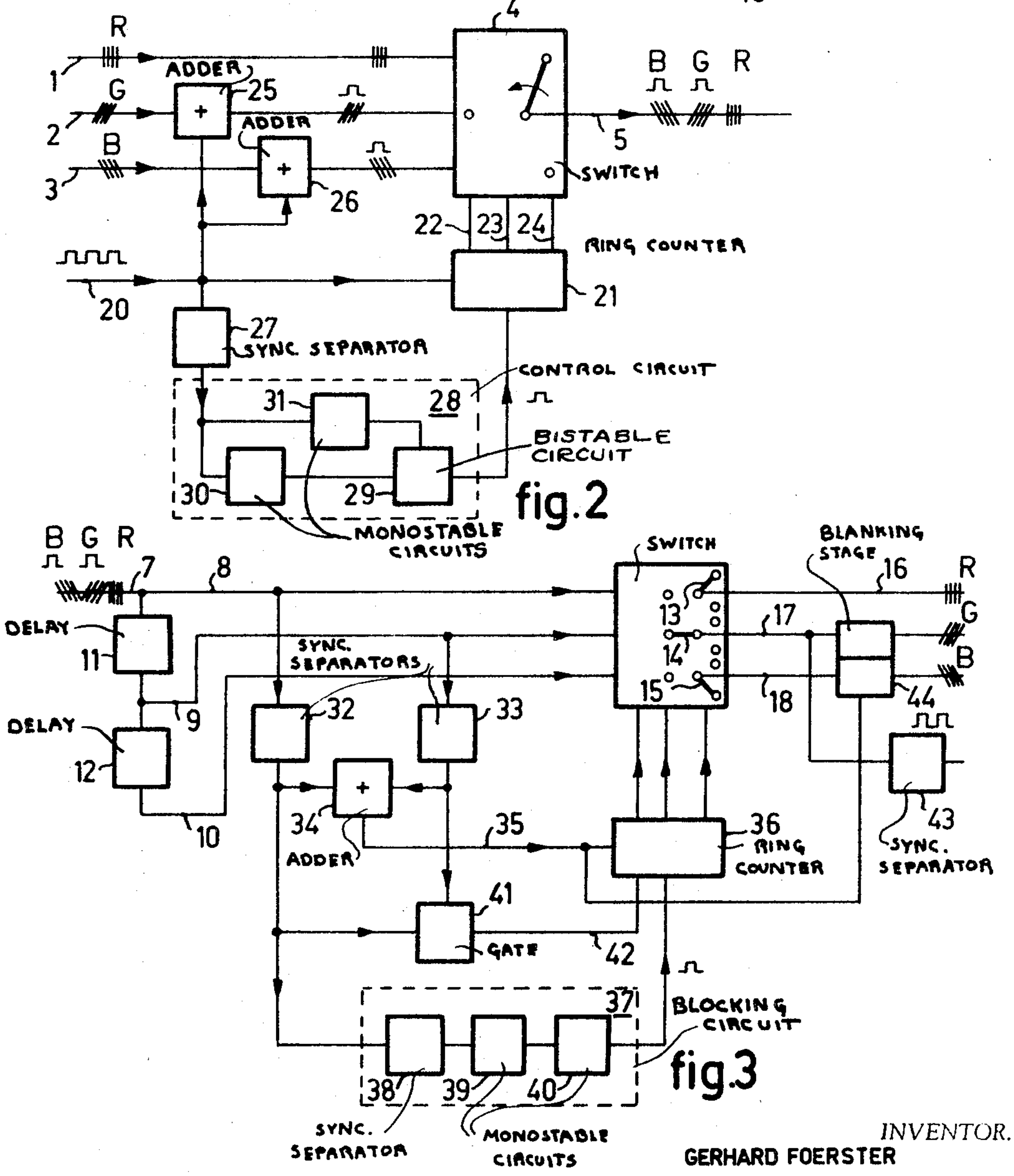
FIGS. 2 and 3 show the block diagram of a method according to the invention for a three-line sequential system according to a first embodiment and FIGS. 4 and 5 for a second embodiment.

FIG. 2 shows the splitting up of a color television signal into a three-line sequential signal and FIG. 3 the recovery of a simultaneous color television signal, synchronizing pulses of the color television signal with the sequential signal being transmitted with (*n*-1) partial components, that is to say two partial components in the present example. 1, 2 and 3 again indicate three channels in which the three partial components red, green and blue of the color television signal are transmitted. By means of switch 4, these partial components are split up into a sequential signal which then occurs at the line 5. The synchronizing pulses of the color television signal are transmitted via a separate line 20, which leads to a three-position ring counter 21 which cyclically switches on the switch 4 from one channel to the next through three lines 22, 23 and 24. The synchronizing pulses are applied through line 20 to two summation stages 25 and 26 included in the channels 2 and 3 before the switch 4, so that synchronizing pulses are cotransmitted with the partial components green and blue, as shown symbolically.

Connected to line 20 is also separating stage 27 for the picture synchronizing pulse which is applied to a control device 28. This control device includes a bistable multivibrator 29, which is controlled, on the one hand, by a monostable multivibrator 30 having a pulse duration of approximately 18.8 msec. and, on the other hand, by a monostable multivibrator 31 having a pulse duration of approximately 1 msec. The said two monostable multivibrators are switched by the leading edge of the picture-synchronizing pulse. The device is such that the end of each pulse from the monostable multivibrators switches over the bistable multivibrator in such manner that the pulse from the monostable multivibrator 30 brings the bistable multivibrator 29 from the rest position to the switched-on position, whereas the monostable multivibrator 31 switches it back to the rest position. Since the picture-synchronizing pulses succeed one another with an interval of 20 msec., the bistable multivibrator is brought into the switched-on position 1.2 msec. before the occurrence of each picture-synchronizing pulse and is restored to the rest position 1 msec. after the occurrence of the picture-synchronizing pulse. This pulse has thus determined very accurately a time interval, during which a picture-synchronizing pulse occurs. The output of the bistable multivibrator 29 is connected to the ring-counter 21 in such manner that, upon occurrence of the pulse, it automatically brings the counter 21 into the switch position at which the switch 4 is switched to the channel 2 of the green partial component. By means of this automatic fixation of the switch it is ensured that each picture-synchronizing pulse is transmitted with the green partial component. Since the switch for switching over from line to line from one partial component to another is always released, at the same instant, namely 1 msec. after the occurrence of a picture-synchronizing pulse, it is ensured that the new sequential splitting up, which is determined by the next line-synchronizing pulse, always begins at the same number of lines and with the same partial component, namely with the partial component following the green in the present example.

It is thus possible, without adding additional identification pulses to the synchronizing pulses of the television signal, to determine the instant at which a new sequential transmission must begin and also with which line of the television signal and with which partial component the sequential switching from one partial component to another begins. However, all parameters which unambiguously determine the switching sequence of switch 4 are thus fixed. As a matter of fact, the specified pulse durations of the monostable multivibrators 30 and 31 can be varied, but essential is only that the picture-synchronizing pulse is included. For the beginning of the switching from line to line it has been found to be most efficacious if this beginning is chosen slightly before the end of the vertical blanking period, that is to say of the order of 20 line periods after the beginning of the picture-synchronizing pulse.

Upon recovering a simultaneous television signal as shown in FIG. 3, the sequential signal is applied through a line 7 to three channels 8, 9 and 10, use being made of two retardation (delay) devices 11, 12 each for one line period and three switches, so that the three lines 16, 17 and !18 ultimately provide again a simultaneous color television signal from the components R, G, B.

The synchronizing pulses of the television signal which are transmitted with the sequential signal are now used for controlling the switches 13, 14, 15. To this end, separating stages 32 and 33 for obtaining the synchronizing pulses are connected to the channels 8 and 9 respectively. The output signal of the said stages is a pulse series in which a pulse is missing between every two pulses. However, since the separation takes place through two channels one of which includes a retardation device, this pulse gap is shifted one line in the two signals. Adding the signals in a summation stage 34 thus results in the complete synchronizing signal on a line 35. This synchronizing signal is used for control of a ring 36, which in turn determines the switching sequence of the switches 13, 14 and 15.

Now it is still necessary to ensure the correct positions of the switches during the transmission of the picture pulse and at the beginning of the switching sequence. This is effected by means of a blocking device 37. To this end, a separating stage 38 for obtaining the picture-synchronizing pulse is connected to the separating stage 32. The picture-synchronizing pulse thus obtained controls by its leading edge a monostable multivibrator 39 having a pulse duration of approximately 18.8 msec., the end of each pulse of which controls a monostable multivibrator 40 having a pulse duration of approximately 2.2 msec. The last-mentioned pulse thus begins before and terminates after each picture-synchronizing pulse which occurs in the channel 8. However, this is exactly the instant at which the switch 4 was automatically switched to the green partial component upon the formation of the sequential signal. The output pulse from the monostable multivibrator 40 is thus applied to an input of the ring-counter 36 such that, during the pulse duration, it automatically assumes a counting position at which the switches 13, 14 and 15 occupy a position at which the switch 14, which provides the green partial component, is connected to channel 8, at which the picture-synchronizing pulse and the green partial component occur at this instant. However, the same condition is thus given via the blocking circuit 37 as upon the start of a sequential transmission. After the release of the counter at the end of the pulse from monostable multivibrator 40, the next control pulse arriving at the line 35 switches the counter further, so that the blue partial component is derived from the channel 8.

The circumstance that no synchronizing pulses are transmitted with the red partial component serves as a criterion that the switch maintains the correct color sequence from line to line. The output signals from the separating stages 32 and 33 are thus applied to a gate circuit 41, which provides an output signal only if a pulse occurs at each input. HOwever, this is possible in only one case, namely if the blue partial component occurs at the channel 8, since the green partial component then lies on the channel 9. In all the other cases a red partial component, which does not carry synchronizing pulses, occurs on one of the channels 8 and 9. The output of the gate circuit 41 thus provides a control signal for the correct switching sequence of the switches, which output is connected through a line 42 to an input of the counter such that, upon occurrence of a pulse, it automatically switches the switches 13, 14 and 15 in such manner that switch 15 of the blue partial component is connected to channel 8. Thus, at each third line it is tested, whether the switches operate satisfactorily and, if not, they are automatically brought into the correct switching sequence. In the most disadvantageous case, for example, if an interference brings the switches out of rhythm, only two lines are transmitted wrongly.

In this manner an absolutely reliable switching sequence of the switches is ensured both in forming the sequential signal and in recovering a simultaneous signal.

As a matter of fact, a partial component other than the green can be used for the transmission of the picture pulse, or the synchronizing pulses can be derived from other channels upon recovering the television signal.

As may be seen from FIG. 3, the complete synchronizing signal may be derived from the line 17 through a separating stage 43. If it is desired to have all color components available without synchronizing pulses, these pulses may be removed in the usual manner by means of blanking stages 44.

Figure 4:
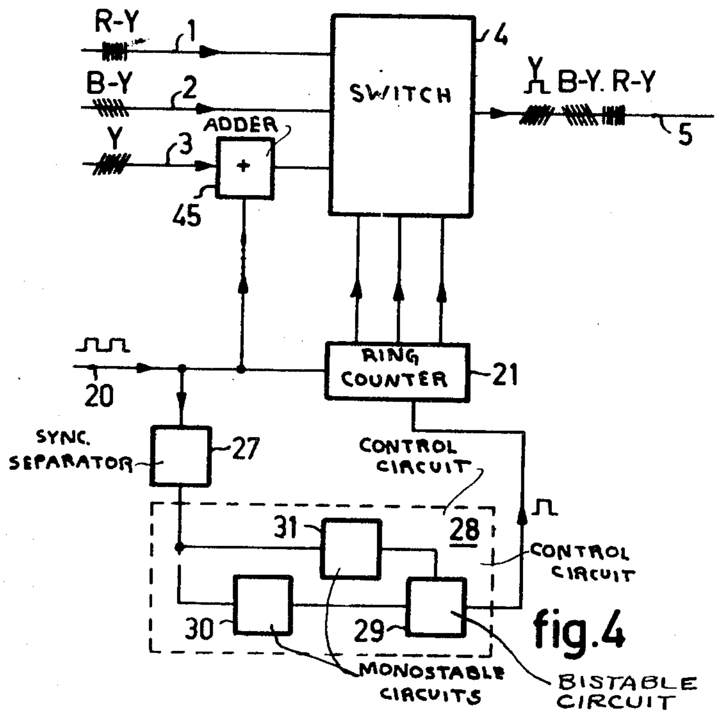
Figure 5:
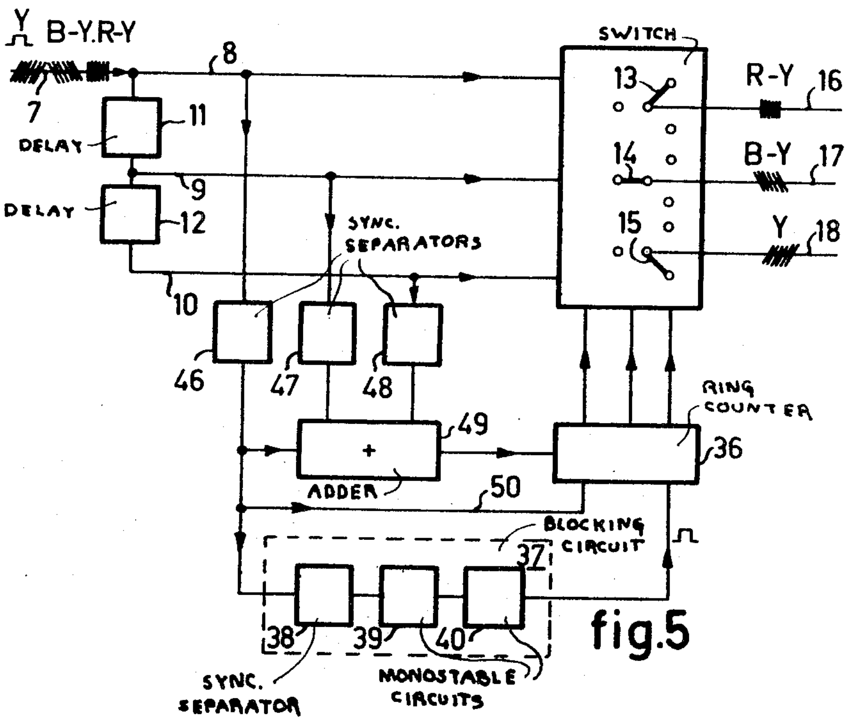

In the method which will be explained with reference to FIGS. 4 and 5, synchronizing pulses of the television signal are transmitted with only one partial component. The partial components then comprise the color information R-Y and B-Y and the brightness information Y, the synchronizing pulses transmitted through line 20 being added to the last-mentioned signal in a summation stage 45. It has been found very efficacious to add the synchronizing pulses to the Y-signal, since this signal has a fixed level during the blanking period. The synchronizing pulses again control a ring counter 21, which operates the switch 4. A separating stage 27 provides the picture synchronizing pulses which are applied to the control device 28 to bring the counter 21 for a given duration, within which the picture-synchronizing pulses occurs, into a switched position which switches the switch 4 to channel 3. Thus, synchronizing pulses are transmitted in the sequential signal only with the partial component Y through line 5.

Upon recovering a simultaneous signal, the synchronizing pulses are derived from all three channels 8, 9 and 10 through separating stages 46, 47, 48 and composed in a summation stage 49 by which the counter 36 is controlled. Further, the signal obtained from the separating stage 46, which contains a synchronizing pulse in each third line, is applied as an additional control signal to counter 36 through a line 50. Thus, the counter is automatically brought each third line into a switched position at which the switch 15 is connected to channel 8 through which at this instant the Y-signal is transmitted with the synchronizing pulses. Furthermore, upon occurrence of a picture-synchronizing pulse, the blocking device 37 again automatically brings about a switched position at which switch 15 is likewise connected to channel 8.

Thus, upon each picture-synchronizing pulse, a new switching sequence is initiated and at each third line it is tested, whether the switches switch in the correct sequence. The criterion for this method is formed by the synchronizing pulses of the television signal which are transmitted with the Y-signal, the obtainment of the additional control signal in the present example being very simple, since the very occurrence of a synchronizing pulse of the television signal is directly characteristic of the sequence of operation of the switches.

Figures 6, 7:
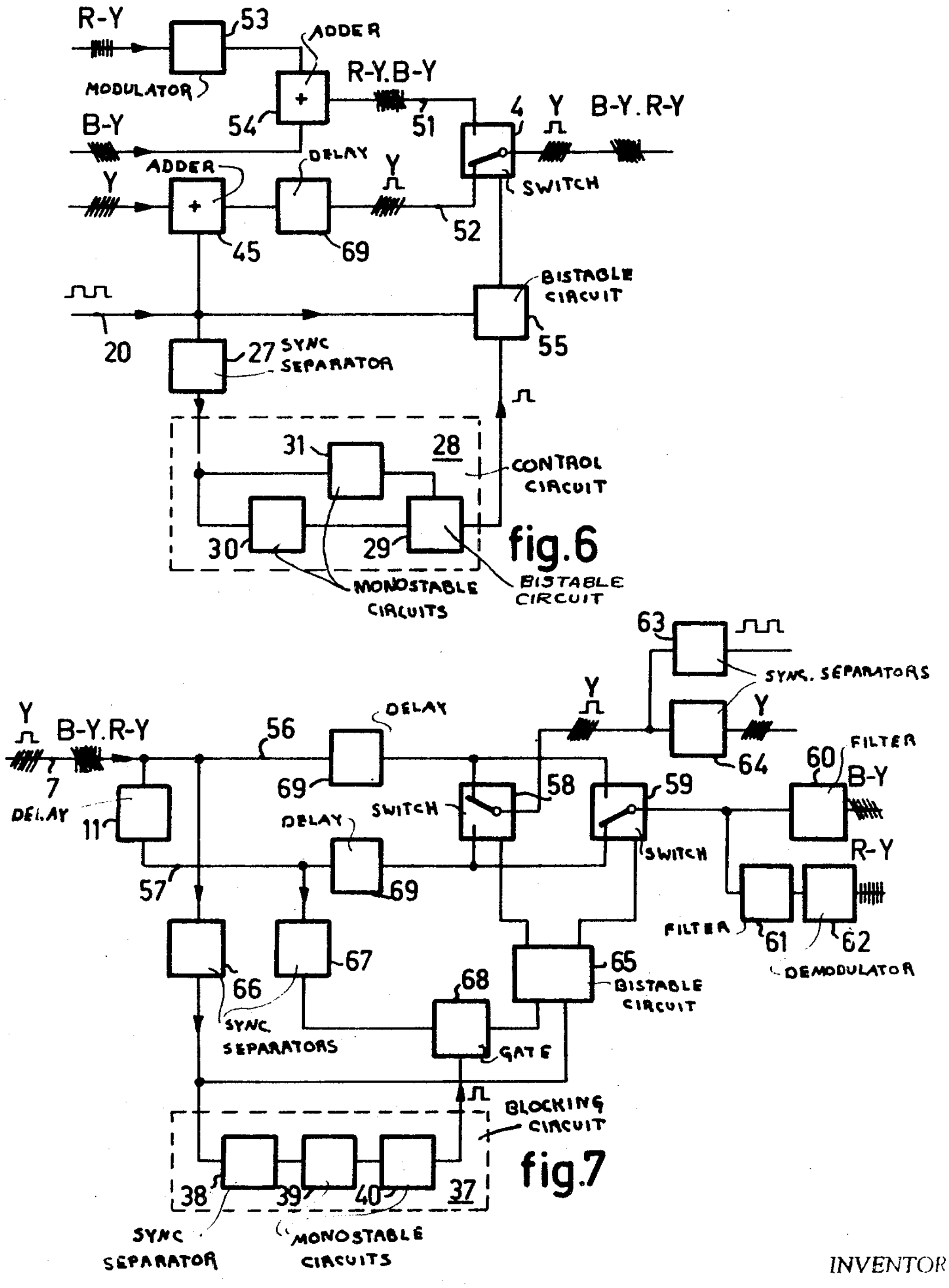
FIGS. 6 and 7 show the block diagram of an embodiment according to the invention for a two-line sequential system.

Such a method can be simplified still further when using a system with two sequential lines, that is to say $n=2$, as will be explained with reference to FIGS. 6 and 7. In this case the complete color information is transmitted in a channel 51 and the brightness information is transmitted in another channel 52. This is effected in such manner that the color component R-Y is modulated on a carrier in a modulating stage 53, for example, in single-sideband amplitude modulation, and is added to the other color component B-Y in an adder stage 54, resulting in a combined signal of the form R-Y, B-Y which serves as one partial component of the sequential signal. The other partial component is formed by the brightness signal Y to which the synchronizing pulses of the color television signal transmitted through line 20 are added in an adder stage 45. The switch 4 again provides for switching over from line to line for producing the sequential signal; in the present example its control needs only one bistable multivibrator 55 which is continually switched over by the synchronizing pulses. By means of separating stage 27 the picture-synchronizing pulse is obtained which operates the control device 28, which, upon occurrence of a picture pulse, switches the bistable multivibrator 55 into the position at which the switch 4 is switched to the channel 52 through which the synchronizing pulses are transmitted with the Y-signal.

Upon recovering a simultaneous signal, the sequential signal reaches through line 7 the two channels 56 and 57, a retardation element 11 providing for a retardation equal to one line period in channel 57. A switch 58 provides the Y-signal and a switch 59 provides the color information, from which the section B-Y is obtained by means of a low-pass filter 60 and the section R-Y is obtained through a high pass filter 61 and a demodulator 62. The synchronizing pulses alone may be obtained from the Y-signal through a separating stage 63, or they may be removed from the Y-signal by means of a separating stage 64.

The switches 58 and 59 are controlled by a bistable multivibrator 65. The synchronizing pulses are separated by means of separating stages 66 and 67, a pulse from channel 56 and a pulse from channel 57 in each case switching the bistable multivibrator 65 into the correct phase position. Upon occurrence of a picture pulse, the blocking device 37 maintains the bistable multivibrator 65 at the position at which switch 58 is switched to channel 56. This is effected merely by including a gate circuit 68 between separating stage 57 and bistable multivibrator 65, said gate circuit being cut off as soon as the blocking device provides a pulse.

The operation is analogous to that which has been explained with reference to the embodiments described hereinbefore. It will be seen that this method provides a very simple solution to the specified problems, which also provides in practice a satisfactory quality of the television signal recovered.

The channel 52 as well as the channels 56 and 57 advantageously each include a retardation element 69 which delays the signals by approximately one-hundredth of the line period. This ensures that the switches 4 and 58 already have switched over with security when the synchronizing pulses are transmitted, so that these pulses can in no case be distorted.

As a matter of fact, a series of variations in the above-mentioned embodiments are possible without passing beyond the scope of the invention. Thus, for example, on recovering the television signal, the picture-synchronizing pulse can be obtained from a channel which retardation in time, even though this is less advantageous, since retardation devices always cause the pulse shape to be distorted slightly. Further, the control of the switches by the synchronizing pulses of the television signal can be effected in the most divergent ways, provided the synchronizing pulses of the television signal itself provide the criterion for the switching sequence of the individual switches.

I claim:

1. A system for converting $n$ simultaneous partial television signals to line sequential signals, wherein $n$ is an integer comprising a source of said $n$ simultaneous partial signal, an output circuit, switch means connected to sequentially apply said simultaneous signals to said output circuit, a source of line and field-synchronizing signals, ring-counter means connected to said switch means, means applying said line-synchronizing pulses to said counter means whereby said switch means is stepped in synchronism with said line-synchronizing pulses, means applying said field-synchronizing pulses to said counter means whereby said counter means is reset to a predetermined position in response to said field-synchronizing pulses, and means for adding said line synchronizing pulses to at least one but less than the total number of said partial signals.

2. A system as claimed in claim 1 wherein said adding means comprises means for adding said line-synchronizing pulses to only one of said partial signals.

3. A system as claimed in claim 2 wherein $n=2$ and said partial signals comprise luminance and brightness signals respectively, and said adding means adds said line-synchronizing pulses to said luminance signal.

4. A system as claimed in claim 1 further comprising means coupled between said adding and switch means for delaying the partial signals containing said line-synchronizing signals by a time substantially equal to one-hundredth of a line period.

5. A system as claimed in claim 1 wherein said second recited applying means starts said ring counter approximately 20 line periods after the beginning of said field-synchronizing pulse.

6. A system as claimed in claim 1 wherein said second recited applying means sets said ring counter to close said switch co transmit a selected partial component upon the occurrence of said field-syncrhonizing pulses.

7. A system for converting a line sequential television signal to $n$ simultaneous partial television signals, wherein $n$ is an integer and said line sequential signals are of the type including field-synchronizing pulses and at least one but less than $n$ of the partial signals in line sequential form include line-synchronizing pulses, said system comprising a source of said line sequential signals, an output circuit, $(n-1)$ delay means connected in cascade to said source, switch means connected to sequentially apply the output of said source and the outputs of said delay means to said output circuit whereby said $n$ simultaneous partial television signals are applied to said output circuit, ring-counter means connected to said switch means, synchronization signal separating means connected to the inputs of said switch means for providing line and field-synchronizing pulses, means applying said line-synchronizing pulses to said ring counter whereby said switch means is stepped in synchronism with said line pulses, and means for applying said field-synchronizing pulses to said counter for resetting said counter to a predetermined position in response to said field-synchronizing pulses.

8. A system as claimed in claim 7 further comprising means for generating a complete synchronization signal from the synchronization signals within said delayed partial signals and means for generating an additional control signal for said ring counter from the synchronization signal in at least one delayed partial signal.

9. A system as claimed in claim 8 wherein said separating means provides said synchronization signals from all of said delayed partial signals and said addition control signal generating means generates said additional control signal from only one delayed partial signals.

10. A system as claimed in claim 7 further comprising additional delay means each coupled to said $(n-1)$ delay means and having a time delay substantially equal to one-hundredth of a line period.

11. A system as claimed in claim 7 wherein said second recited applying means starts said ring counter approximately 20 line periods after the beginning of said field-synchronizing pulse.

12. A system as claimed in claim 7 further comprising means for setting said counter to transmit a selected partial signal upon the occurrence of a synchronization pulse within a selected partial signal.

13. A system as claimed in claim 7 further comprising blocking means coupled to receive said field-synchronizing signals for fixing the position of said switch upon the occurrence of said synchronizing signals.

14. A television signal transmission system comprising a signal converter and a signal reconverter adapted to receive the output of said converter, said signal converter comprising a source of $n$ simultaneous partial television signals, an output circuit, first switch means connected to sequentially apply said partial signals to said output circuit, a source of line and field-synchronizing pulses, first ring-counter means connected to control said first switch means, means applying said line pulses to said first counter means whereby said first switch means is stepped in synchronism with said line pulses, means applying said field pulses to said first counter means whereby said first switch means is reset to a predetermined position in response to said field pulses, and means adding said line pulses to at least one but less than $n$ of said partial signals; said reconverting means comprising an input circuit, $(n-1)$ delay means connected to said input circuit, second switch means connected to sequentially scan said input circuit and the outputs of said delay means whereby said simultaneous signals are reproduced in the output of said second switch means, second ring-counter means connected to said second switch means, means for deriving line and field pulses from the inputs of said second switch means, means applying said derived line pulses to said second counter means whereby said second switch means is stepped in synchronism with said derived line pulses, and means applying said derived field pulses to said second counter means for resetting said second counter means to a predetermined position in response to said derived field pulses.

15. A system as claimed in claim 14 further comprising means for generating a complete synchronization signal from the synchronization signals within said delayed partial signals and means for generating an additional control signal for said second ring counter from the synchronization signal in at least one delayed partial signal.

16. A system as claimed in claim 15 wherein said deriving means derives said synchronization signals from all of said delayed partial signals and said additional control-signal-generating means generates said additional control signal from only one delayed partial signals.

17. A system as claimed in claim 14 further comprising additional delay means each coupled to said $(n-1)$ delay means and having a time delay substantially equal to one-hundredth of a line period.

18. A system as claimed in claim 14 wherein said fourth recited applying means starts said second ring counter approximately 20 line periods after the beginning of said field-synchronizing pulse.

19. A system as claimed in claim 14 further comprising means for setting said second counter to transmit a selected partial signal upon the occurrence of a synchronization pulse within a selected partial signal.

20. A system as claimed in claim 14 further comprising blocking means coupled to receive said field-synchronizing signals for fixing the position of said second switch upon the occurrence of said field-synchronizing signals.